UNITED STATES PATENT OFFICE.

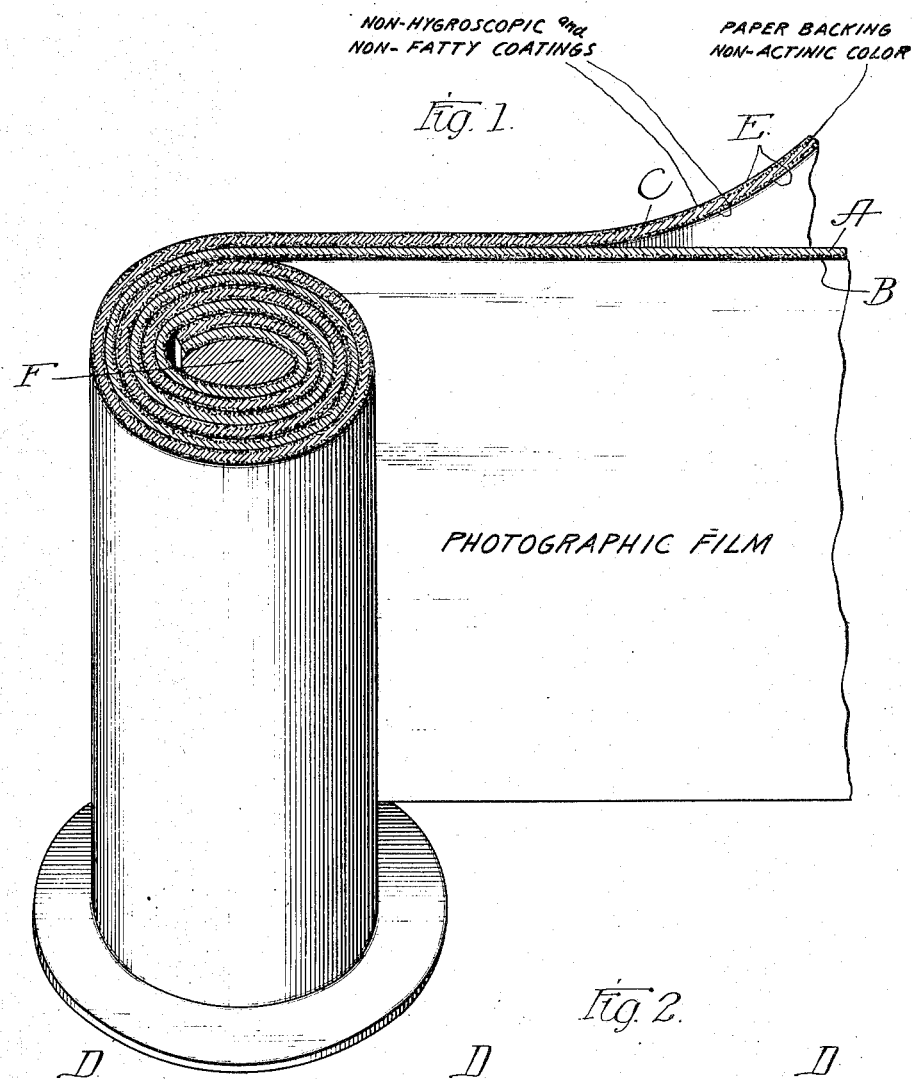

FREDERICK S. TYRRELL, OF WINNETKA, ILLINOIS, ASSIGNOR TO BURKE & JAMES, INC., OF CHICAGO, ILLINOIS, A CORPORATION OF DELAWARE.

PAPER BACKING FOR FILM-CARTRIDGES.

1,300,056.   Specification of Letters Patent.   Patented Apr. 8, 1919.

Application filed November 6, 1915.   Serial No. 60,090.

*To all whom it may concern:*

Be it known that I, FREDERICK S. TYRRELL, a citizen of the United States, residing at Winnetka, in the county of Cook and State of Illinois, have invented certain new and useful Improvements in Paper Backings for Film-Cartridges; and I do hereby declare the following to be a full, clear, and exact description of the invention, such as will enable others skilled in the art to which it appertains to make and use the same.

My invention relates to the art of photography and has particular reference to a backing strip or sheet for use in conjunction with the photographically sensitized surfaces of photographic film, plates, papers and more particularly to film which is usually put up, by the manufacturers, in cartridge form. That is the cartridge consists of a sensitized film attached at one end to a non-actinically colored backing strip, usually made of black paper, and wound together with the film on a flanged spool. The paper serves as a covering for the film, permitting the cartridge to be mounted in and removed from the camera without exposure to light of the sensitized surface. The opaque backing also serves to carry the designations and marks, to be viewed through the sight openings in the camera, for properly positioning the film for exposure. This backing is usually flexible and is impervious to actinic rays and has usually consisted of black paper, that being the cheapest material adapted to the purpose. The marks for setting the film for exposure are usually printed upon the back of the black paper backing in some white pigment, and where a red or orange colored paper backing is used they have been sometimes printed in black. When the film and the backing are wound up on the flanged spool one surface of the backing strip contacts with the sensitized surface of the film. The pigment seems to have more or less of a chemical and actinic action upon the sensitized surface and this is especially noticeable when the cartridge is exposed to dampness, and the sensitized surface is more or less seriously affected by the imprinting thereon of facsimiles of the marks, or other objectionable spots or clouds result.

I prevent this deteriorating action by coating at least that surface of the backing, which contacts with the sensitized surface, with a non-hygroscopic material which is chemically non-reactive on the sensitized film or other surface and is non-fatty, of which a suitable example is collodion, and which is further exemplified by a nitro-cellulose preparation, it being obvious that any suitable substance which is free of any hygroscopic tendency and which has no deteriorating chemical action and is non-fatty may be used.

My invention consists primarily in a backing strip or sheet for contact with photographically sensitized surfaces, having the foregoing characteristics, and consists further in a flexible non-actinically colored backing strip for photographic film cartridges, having the said characteristics.

My invention will be more readily understood by reference to the acompanying drawing forming part of this specification, and in which:

Figure —1— is a fragmentary perspective sectional view of a film cartridge showing the film backed by a protecting strip and illustrating the preferred embodiment of my invention, and Fig. —2— is a fragmentary rear view of my improved backing.

Dry opaque paper does not seem to have any perceptible deteriorating effect upon photographically sensitized surfaces with which it is in contact, but if the paper becomes damp or moist and in this condition comes in contact with the sensitized face of the film or the like when wound up, it produces a deteriorating effect on the emulsion. And when the paper is in this condition and such moisture is also present in the sensitized emulsion, the marks or symbols on the backing become transferred to said emulsion to some extent, or there results therefrom a greasy deposit upon said emulsion, or a chemical reaction results between the pigment of the markings and the emulsion which results in spotting the latter. This I prevent by coating that face of the backing which will contact with the face of the film in the cartridge or film-pack, with a non-hygroscopic material which is also well-known to contain no ingredient which will chemically react with the photographic emulsion of the film, plate or paper and contains no free oil or fat which may, by contact with the sensitized surface, become deposited thereon, and which, furthermore, contains no ingredient which will absorb and subsequently give off certain light rays. This coating is preferably applied after the marks or symbols for positioning given areas of film of a cartridge in the exposure plane have been printed or otherwise produced on the backing so that such symbols or marks are covered thereby and are thus prevented from coming into contact with the sensitized surface when wound in the cartridge.

The coating is made preferably of the waste film consisting of small strips or shavings trimmed from the sheets and which are dissolved in a very volatile liquid such as benzole and dries very rapidly after being spread in a very thin film upon the surface of the paper. It will be understood, of course, that any suitable substitute for this material may be used without departing from the invention.

The film is a nitro-cellulose composition having all the desired characteristics particularly adapting it to the purpose and by using the waste for the purpose, it is obviously very inexpensive.

As used herein, in reference to the backing strip or sheet, the terms, non-actinically colored, and opaque, mean that the strip is so colored that it serves as an effective barrier to actinically active light rays.

In said drawings A is the body of the film, B the sensitized surface thereof, and C is a backing strip usually made of non-actinically colored or black paper and lying in close contact with the back of the film.

In Fig. —1— I have shown the ends of the backing strip and the film separated to more clearly illustrate my invention.

In the section of the cartridge it is clearly shown that the back of the backing C contacts with the face of the film and consequently with the sensitized surface B, and the marks or symbols D on the back of the backing are also brought into close contact with the sensitized surface B.

Usually it is sufficient protection to coat only that side of the backing which contacts with the sensitized surface when the backing and the photographically sensitized sheet are brought into closely related positions such as in a film cartridge, but under some conditions, to make doubly sure, I cover both surfaces of the backing, as shown, with the non-hygroscopic coating E thus effectively preventing the entrance of any moisture into the backing either from one surface or the other.

While my invention is particularly intended and adapted for film cartridges, it is adaptable also for separating sheets for cut-films, film-packs, and plates and photo-papers. Glass plates are usually packed in pairs having their sensitized surfaces opposed and for separating sheets for these plates I prefer to use paper coated on both sides, such paper being preferably black or non-actinically colored, but in all instances where the sensitized surface is opposed to a non-sensitized surface; a separating sheet coated on one side only will answer.

I claim:—

1. A separating sheet to be interposed between two surfaces, one at least of which is photographically sensitized, said sheet being of a non-actinic color and having designation characters impressed upon its surface which is opposed to the sensitized surface, and said surface, carrying said designation characters, coated with a non-hygroscopic and non-fatty substance.

2. A non-actinic separating strip for photographically sensitized elements, designation characters on the surface of said strip which is adapted to be opposed to and to contact with a sensitized surface, and said surface carrying said designation characters coated with a non-hygroscopic and non-fatty substance.

3. A protecting sheet of a non-actinic color adapted for use in covering photographically sensitized surfaces having the surface adapted to be opposed to and to contact with a sensitized surface provided with designation characters impressed thereon, and said surface and designation characters thereon coated and covered with a non-hygroscopic, chemically non-reactive and non-fatty substance.

4. A non-actinically colored separating sheet for photographically sensitized elements, having a surface which is adapted to be opposed to and to contact with a sensitized surface of said elements provided with designation characters impressed thereon, and said surface and characters thereon coated and covered with a non-hygroscopic and non-fatty coating.

5. A non-actinically colored flexible separating strip for use with photographically sensitized film, having the surface thereof, which is adapted to be placed in contact with the sensitized surface of the film, provided with designation characters impressed thereon, and the characters and said surface coated with a non-hygroscopic and non-fatty coating.

6. A separating strip of a non-actinic color adapted to be wound with sensitized film in spool form, designation markings on the back of said strip, and said back and markings covered with a transparent non-hygroscopic and non-fatty coating and adapted to be disposed in contact with the sensitized face of the film when wound in such spool form.

In testimony whereof, I have signed my name in presence of two subscribing witnessses.

FREDERICK S. TYRRELL.

Witnesses:
M. M. BOYLE,
CHAS. S. MONTGOMERY.